United States Patent
Rosa et al.

[11] Patent Number: 5,788,172
[45] Date of Patent: Aug. 4, 1998

[54] FISHING REEL FOR PRECISE CONTROL OF FEED AND BRAKING OF FISH LINE WHEN CASTING

[76] Inventors: Claudio Rosa; Gerardo Petruzzelli, both of Via del'Astore, 48, 00169 Roma, Italy

[21] Appl. No.: 573,666

[22] Filed: Dec. 18, 1995

[51] Int. Cl.⁶ .................................................. A01K 89/01
[52] U.S. Cl. ........................ 242/240; 242/236; 242/245
[58] Field of Search ............................ 242/236, 240, 242/244, 245, 239

[56] References Cited

U.S. PATENT DOCUMENTS

| | | | |
|---|---|---|---|
| 3,093,340 | 6/1963 | Mauborgne | 242/236 |
| 3,385,536 | 5/1968 | Sarah | 242/236 |
| 4,378,914 | 4/1983 | Shackelford et al. | 242/245 |
| 4,634,073 | 1/1987 | Coquelet | 242/245 |
| 4,676,451 | 6/1987 | Dispas | 242/245 |

FOREIGN PATENT DOCUMENTS 740296 11/1955 United Kingdom ................. 242/244

*Primary Examiner*—Donald P. Walsh
*Assistant Examiner*—Emmanuel M. Marcelo
*Attorney, Agent, or Firm*—Laurence R. Brown

[57] ABSTRACT

Fishing reel improvements release and reengage fishing line on a reel with braking in a manner permitting greater casting speed and precision and better control of the line fishing. Thus, by pressing a first manual line feeding lever, line may be freely dispensed at a speed controlled by a second manual braking lever.

1 Claim, 5 Drawing Sheets

5,788,172

1

FISHING REEL FOR PRECISE CONTROL OF FEED AND BRAKING OF FISH LINE WHEN CASTING

In sport fishing, great importance is justly given to the equipment, and particular prominence is given to the rod and reel, which, according to their characteristics, can be better suited to one type of fishing than to another.

In the area of fishing-reels, generally speaking, two types of reels can be distinguished: fixed-bobbin reels and rotating bobbin reels.

Fixed-bobbin reels cost less and can be suitable for any kind of fishing, while rotating-bobbin reels are suitable for deep sea fishing, for large fish, where there is a need for a large capacity to contain the fishing-line.

In the field of fixed-bobbin reels, it is possible to distinguish once more between open fixed bobbin reels, where the line container is visible, and covered fixed-bobbin reels, where the line container cannot be seen.

In fishing acts using these types of reels, it is necessary to use both hands; for example, to cast the bait out, the right hand grips the rod, the index finger holds the fishing-line, and the left hand lifts the bow or, indirectly; then the line is cast using classical, well known movements, raising the finger at the right moment and letting the line go tree. It is obvious that casting, following the steps described, requires considerable synchronization and coordination between the right and left hands, and that the precision of the cast can be influenced by even small hesitations.

The object of the present invention is to make improvements in fishing-reels that render it possible to place the commands for automatic release and re-engagement of the fishing-line and the operation of the brake in the best position for their use, thus permitting greater speed in the casting phase, greater casting precision, and greater speed in controlling the fishing-line while fishing.

According to the invention, in the fishing-reel, the release and re-engagement of the fishing-line contained on the spool which is located in the upper part of the fishing-reel is obtained by the axial movement of a push-rod which is linked, by means of appropriate returns, to a lever or button located on the chassis in such a position that the fingers of the hand holding the rod can work it with minimum movement and without losing their grip on the rod. The device or button that operates the release-re-engagement of the line, when it is operated, controls the movement of a push-rod by means of some connecting levers and elastic retention devices; this push-rod is placed in a central position on the reel, in such a way that, when the push-rod is in the rest position or of engagement of the line, the fishing-line contained on the spool is prevented from spinning by the barrier created by the sliding push-rod, which strikes against the retaining wedge, a barrier which the line must pass through to release itself and run free.

In the release position, the engagement/release mechanism operated by the fisherman, thanks to connecting levers with appropriate fulcra, causes the push-rod to move downward just enough to permit the blocking barrier to open and to allow the fishing-line to unwind freely. As soon as the fisherman releases the engagement/release control, the elastic devices provided for that purpose cause the immediate upward movement of the sliding push-rod and the restoration of the barrier between the push-rod and the wedge, which prevents the fishing-line from coming out.

As mentioned above, another problem related to fishing-reels which the present invention aims to solve is that of the brake or clutch which, as was said, plays a role of considerable importance while fishing because it permits the increase in the resistance of the release of line if the fish caught is too big with respect to the resistance of the line being used.

According to the invention, a lever or button placed on the chassis in the immediate vicinity of the lever for operating the engagement/release device described above, when operated by the fisherman, puts the brake arm in motion, which then pushes against a brake-shoe and tightens it. The brake-shoe, when tightened, causes a spinning element acting as the brake block to slow down. This block is equipped with a number of male studs, three, for example, consisting of elements in the form of arcs of a circle which are inserted in matching locations on the line spool. In the rest position of the brake, the spool is free to turn and, hence, the liner can come off of the spool freely; operating the brake/clutch mechanism, the brake arm pushes against the brake-shoe and tightens it, reducing the speed of the spin of the element, on which depressions matching the male studs have been prepared, or completely stopping it and, as a result, the spool inserted on it.

In order to permit the action of the brake arm on the shoes to be regulated, an element is provided for pre-regulating the brake/clutch action, making it possible to increase or decrease the brake arm's movement with respect to the shoe in such a way as to cause the immediate halt of the spool or its gradual braking.

Obviously, this pre-regulation device can also be operated while fishing, thus adapting the working of the brake/clutch to fishing conditions or the kind of fish.

As mentioned earlier, two kinds of action are provided for the mechanisms for engaging and releasing the fishing-line and for the brake/clutch, one characterized by two levers and the other by two buttons. It is evident that, depending on the operating mechanism adopted, the return and operating levers can vary, but the operating principles and mechanisms remain the same.

All that has been said in summary up to this point can be understood better making use of the detailed description that follows, and referring to the attached drawings, in which.

Figure 1:
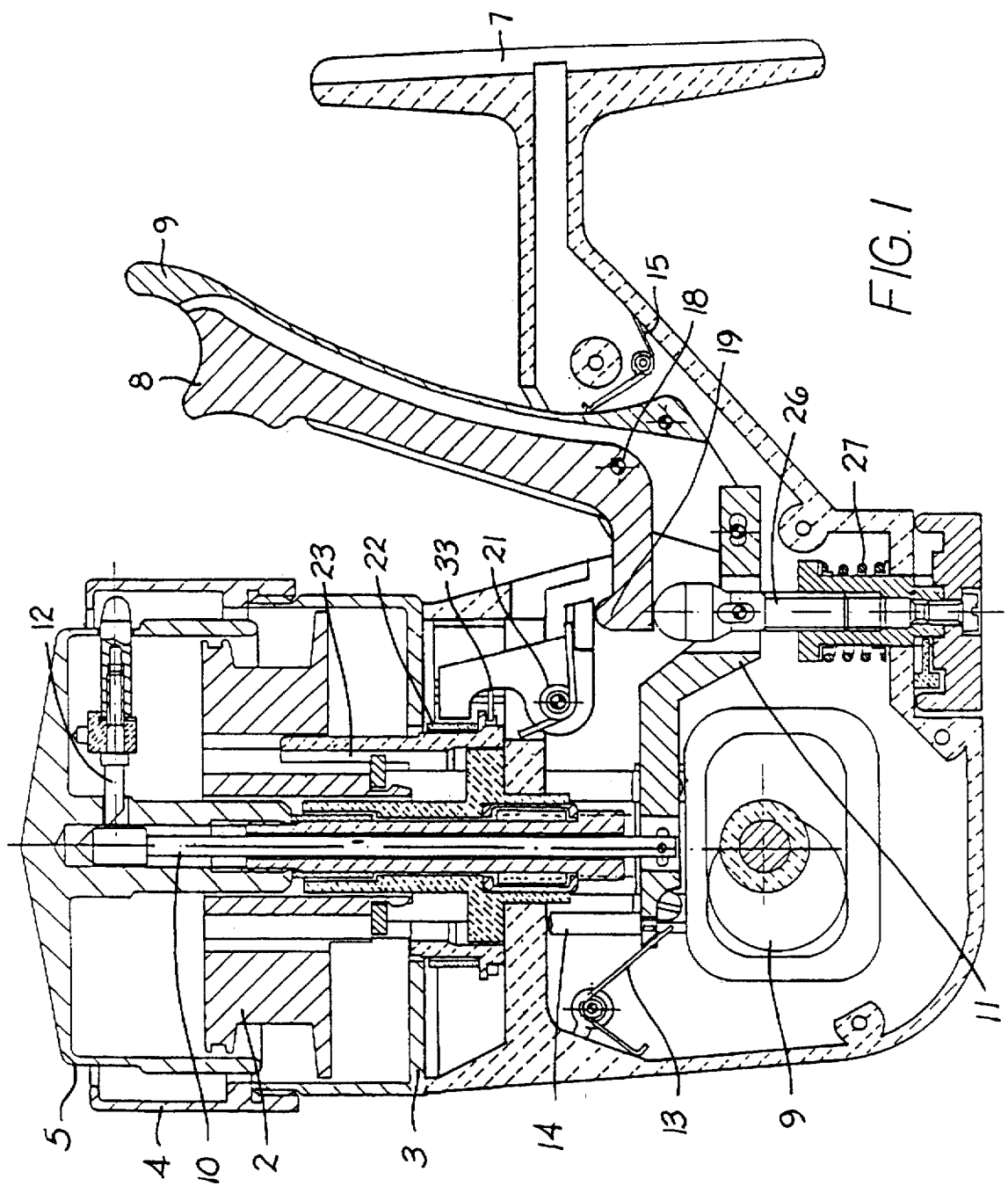
FIG. 1 shows a cross-section of the fishing-reel of the present invention.

In reference to these figures, the fishing-reel of the present invention consists of a chassis 1 similar to that of other fishing-reels, in which there is a housing for the bobbin 2, a retainer 3, an external ring 4 to protect the spool, and a fly-wheel 5. Further down, there is a handle 6 for winding the fishing-line.

On the rear side of the chassis, near the support 7 for attaching the fishing-reel to the fishing-rod, there are controls 8 and 9 for operating the brake/clutch and the engagement/release of the fishing-line.

The release/engagement of the fishing-line, controlled by lever 9, is brought about by means of a sliding push-rod 10, which is placed in a position axially central in relation to the bobbin 2. The axial sliding of the push-rod is determined by the pulling action that the fisherman performs on control 9 which, if pulled, by means of the release lever 11 causes the push-rod 10 to be lowered.

The push-rod 10, when lowered, allows the fishing-line contained on the bobbin 2 to unwind freely, passing between the space which, thanks precisely to the lowering of the push-rod 10, was created between the same push-rod 10 and the retaining wedge 12.

The release spring 13, when the fisherman stops pulling on control 9, brings the push-rod 10 back up into the engaged position, nullifying the space that was created between the push-rod 10 and the retaining wedge 12 and instantly blocking the unwinding of the fishing-line.

A stroke pin 14 ensures that the sliding push-rod 10 comes to rest in the desired position. A spring 15, placed at the base of control 9, eliminates any play that could be brought about with use and that could compromise the speed and sensitivity of the controls.

As mentioned earlier, the control 9 can be embodied in the support for attachment to the fishing-rod 7 by means of a button 9 which, when pushed, causes forward motion of the connecting rod 16, which has an appropriate fulcrum, and, by means of the return 17, pulls back the release lever 11, as in the previously described solution, thus causing the lowering of the push-rod 10 and the freeing of the fishing-line.

In one of the solutions foreseen, on the inside in relation to control lever 9, there is a lever 8 which, when pushed towards the outside, operates the brake or clutch which makes it possible to slow down or stop the unwinding of the fishing-line.

Figure 2:
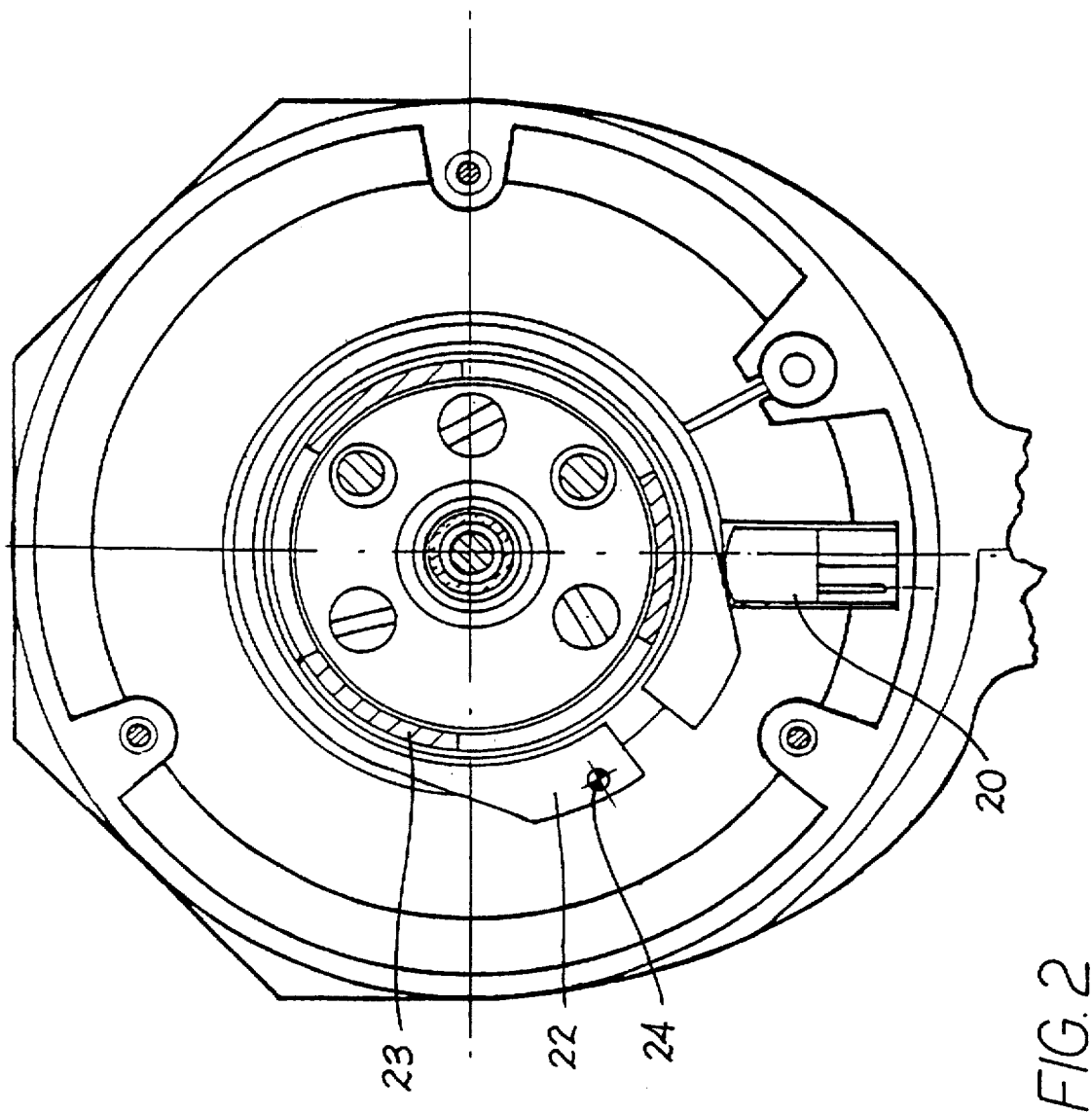
FIG. 2 shows an over-head view of the brake/clutch group.
Figure 3:
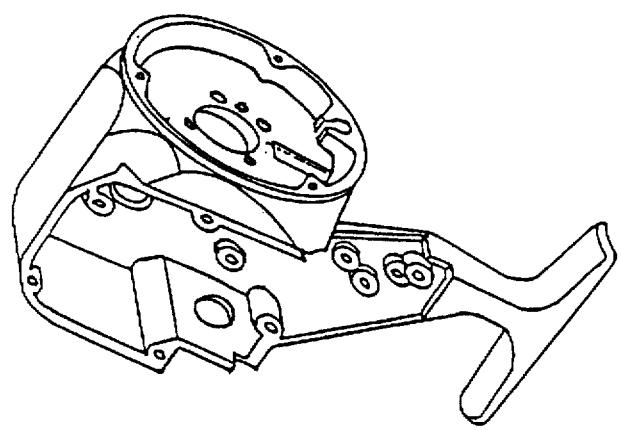
FIG. 3 shows an axonometric view of the fishing-reel chassis.
Figure 5:
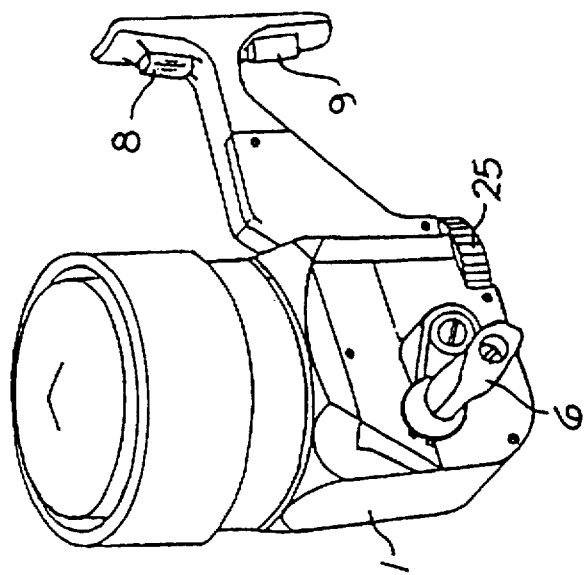
FIG. 4 and 5 show an axonometric view of the configurations using command levers or buttons.
Figure 4:
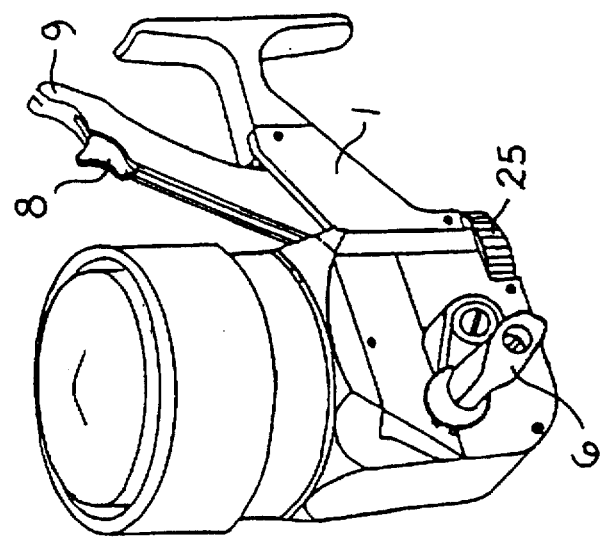
Figure 6:
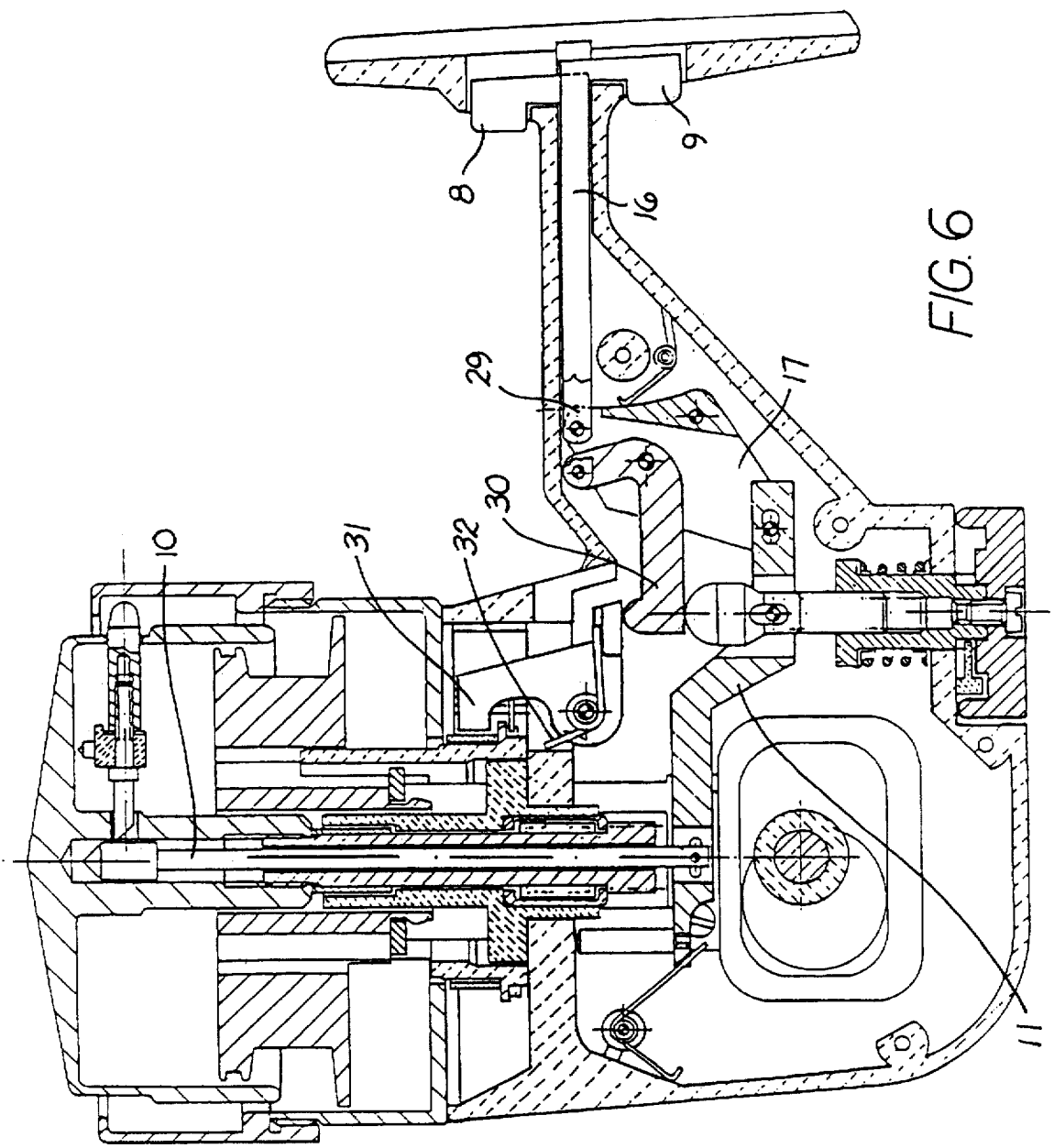
FIG. 6 shows a cross-section of the fishing-reel with command buttons.

Lever 8, as can be seen in FIG. 1, has ito fulcrum at 18 and is elbow-shaped in such a way that, when pushed, its end part 19 pushes the brake arm 20 towards the center of the fishing-reel, said arm also being appropriately shaped and having its fulcrum at 21. The arm 20, as can be seen better in FIG. 2, pushes on the brake 22, which consists of a circular elastic element, split and shaped, with its fulcrum at 24 and which surrounds the brake block 23 on which the fishing-line bobbin is located. When the brake/clutch is operated, the arm 20 pushes against the brake 22 which, having its fulcrum at 24, tightens around the block 23, reducing the speed of tis rotation until it stops completely.

Since the brake element 22 is elastic, once the brake arm 20 action has stopped, it immediately returns to tis position and leaves the bobbin mounted on the brake blocks 23 free to turn.

As already mentioned, the action of the brake/clutch must be more or less immediate in relation to fishing conditions; therefore, a control 25 has been provided for rapid operation to permit the pre-regulation of the path of the lever 19 in relation to the arm 20. When the push-in 26 is regulated by means of control 25 in its lowest position, the path of the lever 19 and of the arm 20 on the brake 20 will be greater and the operation of the brake, as a result, will be slower and more gradual. When on the other hand, the push-pin 26 is regulated in its highest position, the path of the lever 19 in relation to the arm 20 will be less and the braking of the fishing-line will be immediate.

The push-pin 26 is provided with a spring 27 that keeps it in the established position, also thanks to a set-screw 28.

As in the case of the control for engagement/release of the fishing-line, it is also foreseen in this case that the control lever 8 can be replaced with a control button, in which case, pushing the button 8 causes the return 29 to be pulled, and the lever 30 to be raised, pressing it against the arm 31 and causing, as in the previous case, the braking action. A spring 32 brings the arm back to its rest position when the braking action is finished.

To indicate whether the fishing-line has stopped moving or is still unwinding from the bobbin and at what speed, in the case of a fish whose weight is greater than the setting to which the clutch has been calibrated, an acoustic signal 33 has been provided that marks each turn of the bobbin. Another acoustic signal 34 is provided to mark the turns that the pre-setting mechanism of the brake as had to make.

We claim:

1. In a fishing reel of the fixed bobbin type having a longitudinally moving member coaxially arranged within the fixed bobbin operable to control passage of line from the bobbin for casting, the manually controlled fishing reel mechanism for improving casting precision comprising in combination:

a fixed bobbin having a central axis, said longitudinally moving member comprising a push-rod in said rest position against cooperating wedging means to prevent line from freely unreeling from the bobbin in one of two states and for producing a gap for freely unreeling the line from the bobbin when the push-rod is axially moved into an actuated position in the other state, manually actuated control means for moving the push rod into said actuated position by movement away from the wedging means thereby to free the line for unreeling from the bobbin when casting, a substantially cylindrical shaped spinning element for dispensing line from the bobbin, and braking means operable from a further manually actuated braking control lever for braking the spinning of said spinning element, thereby to control drag on the line while fishing, comprising an elastic brake band concentrically surrounding said spinning element for moving into frictional contact therewith.

* * * * *